US007343416B2

(12) United States Patent
Hodges et al.

(10) Patent No.: US 7,343,416 B2
(45) Date of Patent: Mar. 11, 2008

(54) METHODS, SYSTEMS, AND PRODUCTS FOR PROVIDING COMMUNICATIONS SERVICES AMONGST MULTIPLE PROVIDERS

(75) Inventors: Donna K. Hodges, Cumming, GA (US); Barrett Morris Kreiner, Norcross, GA (US); Steven N. Tischer, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 918 days.

(21) Appl. No.: 10/720,956

(22) Filed: Nov. 24, 2003

(65) Prior Publication Data

US 2005/0114542 A1    May 26, 2005

(51) Int. Cl.
    *G06F 15/32* (2006.01)
(52) U.S. Cl. ..................................................... 709/227
(58) Field of Classification Search ......... 709/225–229
    See application file for complete search history.

(56) References Cited

U.S. PATENT DOCUMENTS

| | | | |
|---|---|---|---|
| 5,752,186 A | 5/1998 | Malackowski et al. | |
| 5,790,176 A | 8/1998 | Craig | |
| 5,862,471 A | 1/1999 | Tiedemann et al. | |
| 5,978,780 A | 11/1999 | Watson | |
| 6,002,689 A | 12/1999 | Christie | |
| 6,016,307 A | 1/2000 | Kaplan | |
| 6,058,301 A | 5/2000 | Daniels | |
| 6,104,718 A | 8/2000 | Christie | |
| 6,178,170 B1 | 1/2001 | Duree | |
| 6,285,871 B1 | 9/2001 | Daniels | |
| 6,385,198 B1 | 5/2002 | Ofek | |
| 6,456,594 B1 | 9/2002 | Kaplan | |
| 6,516,194 B2 | 2/2003 | Hanson | |
| 6,519,693 B1 | 2/2003 | Debey | |
| 6,522,883 B2 * | 2/2003 | Titmuss et al. | 455/445 |
| 6,567,375 B2 | 5/2003 | Balachandran | |
| 6,934,530 B2 | 8/2005 | Engelhart | |
| 6,950,847 B2 * | 9/2005 | Harrisville-Wolff et al. | 709/201 |
| 6,978,308 B2 * | 12/2005 | Boden et al. | 709/229 |
| 7,155,517 B1 | 12/2006 | Koponen | |
| 2001/0029544 A1 | 10/2001 | Cousins | |
| 2002/0073182 A1 * | 6/2002 | Zakurdaev et al. | 709/220 |
| 2002/0087674 A1 | 7/2002 | Guilford | |
| 2002/0112060 A1 | 8/2002 | Kato | |
| 2002/0164018 A1 | 11/2002 | Wee | |
| 2002/0176378 A1 | 11/2002 | Hamilton | |
| 2003/0012376 A1 | 1/2003 | Wee | |
| 2003/0043815 A1 | 3/2003 | Tinsley | |

(Continued)

FOREIGN PATENT DOCUMENTS

WO    WO 00/41426    7/2000

*Primary Examiner*—Krisna Lim
(74) *Attorney, Agent, or Firm*—Scott P. Zimmerman, PLLC; Geoff Sutcliffe; Jodi Hartman

(57) ABSTRACT

Methods, systems, and products are disclosed for providing communications services. One method discovers multiple communications networks available to a client communications device. A request for communications service is communicated from the client communications device to at least one service provider. The at least one service provider provides access to at least one of the multiple communications networks. Access to at least one of the multiple communications networks is negotiated with the at least one service provider. Communications service is then received from the at least one service provider via at least one of the multiple communications networks.

20 Claims, 17 Drawing Sheets

U.S. PATENT DOCUMENTS

| | | |
|---|---|---|
| 2003/0088778 A1 | 5/2003 | Lindqvist |
| 2003/0093550 A1 | 5/2003 | Lebizay |
| 2003/0211856 A1 | 11/2003 | Zilliacus |
| 2004/0249927 A1 | 12/2004 | Pezutti |
| 2005/0038637 A1 | 2/2005 | Balakrishnan |
| 2005/0094725 A1 | 5/2005 | Hui |
| 2006/0031515 A1* | 2/2006 | Van Gassel et al. ........ 709/227 |
| 2006/0041679 A1 | 2/2006 | Feig |

* cited by examiner

BID FOR COMMUNICATIONS SERVICE FROM SERVICE PROVIDER i) price for utilizing the communications network, ii) a date that the request for communications service will be fulfilled, and iii) a time that the request for communications service will be fulfilled iv) alternative performance, pricing, and/or delivery options

58

METHODS, SYSTEMS, AND PRODUCTS FOR PROVIDING COMMUNICATIONS SERVICES AMONGST MULTIPLE PROVIDERS

CROSS-REFERENCE TO RELATED APPLICATIONS

This application relates to the copending and the commonly assigned U.S. application Ser. No. 10/720,941, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,949, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,586, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,800, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,780, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,946, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,587, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,892, entitled "Methods for Providing Communications Services", filed concurrently herewith, and of which the "Brief Summary of the Invention" section and the "Detailed Description of the Invention" section are incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to computers and to communications and, more particularly, to processing data in a communications network.

2. Description of the Related Art

Manipulation of electronic data is important in computer networking and in communications. Often times electronic data must be manipulated for presentation at a client communications device. That is, the electronic data must be changed, formatted, or altered to suit the display characteristics, processing abilities, and/or storage capabilities of the client communications device. A handheld personal data assistant, for example, often requires that bandwidth-intensive electronic data, such as on-demand video, be scaled, color corrected, and/or otherwise manipulated for optimum presentation on the small display of the handheld personal data assistant. Heretofore, however, manipulation of electronic data was usually the responsibility of the client communications device—that is, the client communications device stores and utilizes one or more computer programs to manipulate incoming electronic data for presentation on the client communications device.

Locally manipulating electronic data, however, poses problems. As the electronic data is received, the client communications device must store the electronic data, process/manipulate the electronic data, and present the manipulated electronic data to the user. This process of storing, manipulating, and/or presenting the electronic data, however, often taxes the limited processing and storage capabilities of the client communications device. As both those skilled and unskilled recognize, when the processing and/or storage capabilities of the client communications device are overwhelmed, the audio/video presentation may "stumble" and degrade the user experience. Sometimes the client communications device even experiences a fault or failure when the processing and/or storage capabilities are overwhelmed. There is, accordingly, a need in the art for methods and systems of manipulating electronic data that reduce the need for locally-stored computer programs and that reduce the need for local processing requirements.

BRIEF SUMMARY OF THE INVENTION

The aforementioned problems, and other problems, are reduced by a Analysis Module. This Analysis Module comprises methods, computer systems, computer programs, and computer program products that provide communications services. Each time the user of the client communications device desires to receive one or more communications services, the Analysis Module dynamically discovers what communications networks are available to the user. The Analysis Module then negotiates with those communications networks to determine what communications network, and/or what service provider, provides the best or preferred scenario for providing that communications service. When the client communications device requires communications service, the term "communications service" means the client communications device requests a data upload and/or a data download via a communications network. The term "data" includes electronic information, such as, for example, facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, and/or (4) profiles associated with configuration, authenticity, security, and others. When the Analysis Module discovers what communications networks are available to the client communications device, the term "available" means a communications network is accessible to the client communications device. That is, the client communications device has the hardware requirement(s) and/or the software requirement(s) to access, and to communicate with, one or more of the communications networks.

The client communications device, at any one time, may have access to more than one communications network. The user, for example, at any one time, might have access to a wireline network, a cellular wireless network, and other wireless networks (such as the I.E.E.E. 802 family, Radio Frequency, and BLUETOOTH®) (BLUETOOTH® is a registered trademark of the Bluetooth Special Interest Group, Inc.). The Analysis Module discovers what communications networks are available to the user, and then the Analysis Module receives bids from the available communications networks (or the service provider for each communications network). The Analysis Module then determines which bidder can provide the communications service within any performance, pricing, and delivery constraints. If more than one bidder satisfies the constraints, the Analysis Module might favor one service provider, one communications network, or even a series/combination of multiple communications networks. The Analysis Module might also accept another round of bidding/negotiation to further enhance performance, pricing, and/or delivery objectives. Once the Analysis Module settles on a winning bid, the Analysis Module 20 then accepts service from the winner.

This invention discloses methods, systems, and products for providing communications services. One of the embodiments describes a method for providing communications services. This method discovers multiple communications networks available to a client communications device. A request for communications service is communicated from the client communications device to at least one service provider. The at least one service provider provides access to at least one of the multiple communications networks. Access to at least one of the multiple communications networks is negotiated with the at least one service provider. Communications service is then received from the at least one service provider via at least one of the multiple communications networks.

Other embodiments of this invention describes another method for providing communications services. Here a request for communications service is received, and the request for communications service originates from a client communications device. The request for communications service requests communications service from a communications network available to the client communications device. A preferred scenario of segmentation, dispersion, and assemblage of electronic data is ascertained to fulfill the request for communications service. A bid is developed to utilize the communications network to fulfill the request for communications service, and the bid is communicated to the client communications device. The client communications device may then accept or deny the bid.

Other embodiments of this invention describe a system for providing communications services. The system includes a Analysis Module stored in a memory device, and a processor communicates with the memory device. The Analysis Module discovers multiple communications networks available to a client communications device. The Analysis Module communicates a request for communications service from the client communications device to at least one service provider, with the at least one service provider providing access to at least one of the multiple communications networks. The Analysis Module negotiates with the at least one service provider for access to at least one of the multiple communications networks. The Analysis Module receives communications service from the at least one service provider via at least one of the multiple communications networks.

Other embodiments of this invention describe a computer program product. A computer-readable medium stores a Analysis Module. The Analysis Module discovers multiple communications networks available to a client communications device. The Analysis Module communicates a request for communications service from the client communications device to at least one service provider, with the at least one service provider providing access to at least one of the multiple communications networks. The Analysis Module negotiates with the at least one service provider for access to at least one of the multiple communications networks, and the Analysis Module receives communications service from the at least one service provider via at least one of the multiple communications networks.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
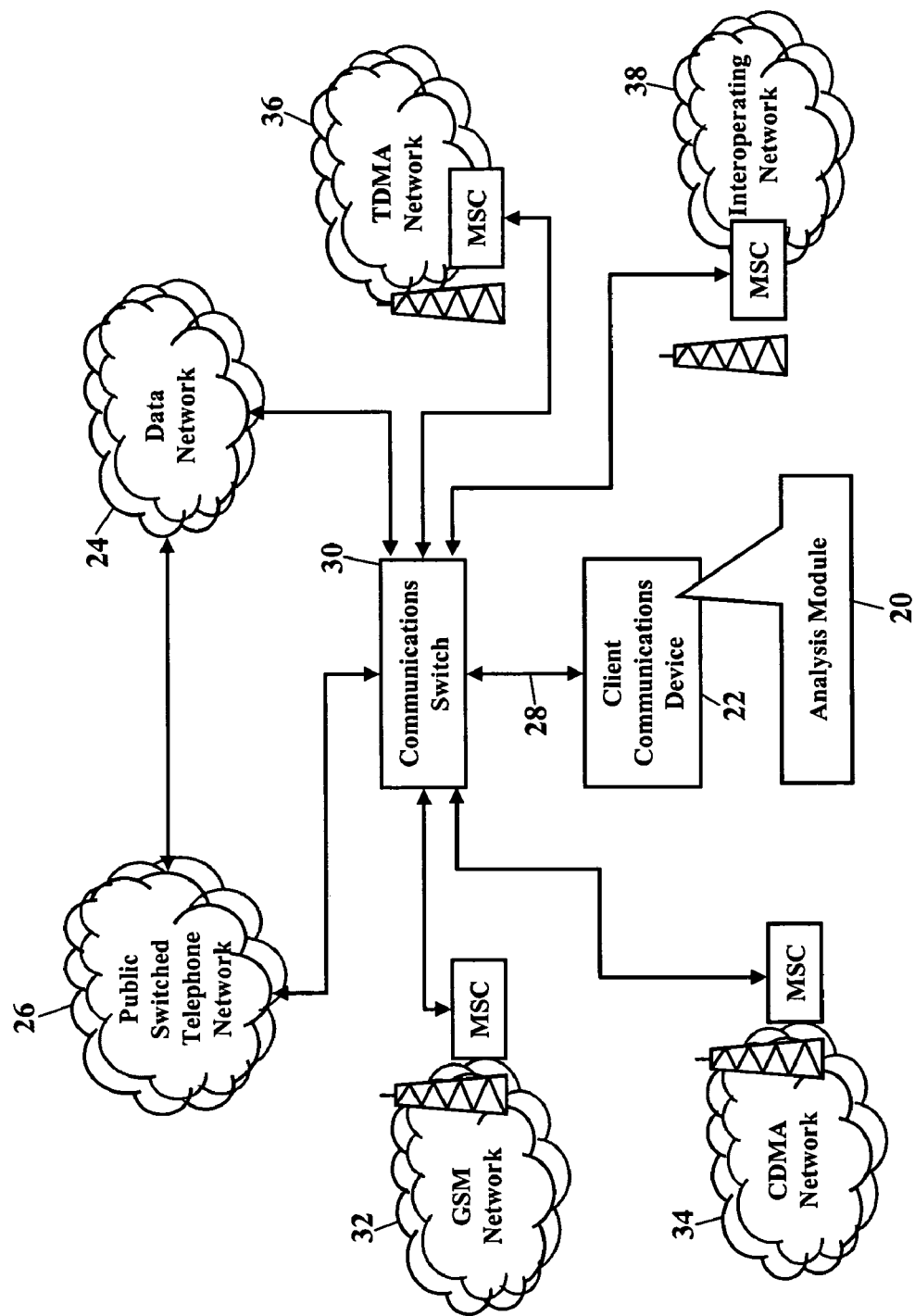
FIG. 1 is a schematic illustrating a Analysis Module operating within a client communications device, according to one of the embodiments of this invention.

FIG. 1 is a schematic illustrating a Analysis Module 20 operating within a client communications device 22, according to one of the embodiments of this invention. The client communications device 22 represents just one of the possible operating environments for the Analysis Module 20. The client communications device 22 may include any computer/communications device utilizing a microprocessor and/or a digital signal processor. The client communications device 22 may include, for example, a computer (laptop, desktop, tablet, server, and other computer systems), a personal digital assistant (PDA), a Global Positioning System (GPS) device, an interactive television, an Internet Protocol (IP) phone, a pager, and/or a cellular/satellite phone. The Analysis Module 20 is stored within memory of the client communications device 22. The Analysis Module 20 comprises methods, computer systems, computer programs, and computer program products that provide communications services to a user. Each time the user of the client communications device 22 desires to receive one or more communications services, the Analysis Module 20 dynamically discovers what communications networks are available to the user. The Analysis Module 20 then negotiates with those communications networks to determine what communications network, and/or what service provider, provides the best or preferred scenario for providing that communications service. The user, for example, at any one time, might have access to a wireline network, a cellular wireless network, and other wireless networks (such as the I.E.E.E. 802 family, Radio Frequency, and BLUETOOTH®) (BLUETOOTH® is a registered trademark of the Bluetooth Special Interest Group, Inc.). The Analysis Module 20 discovers what communications networks are available to the user, and then the Analysis Module 20 receives bids from the available communications networks (or the service provider for each communications network). The Analysis Module 20 then determines which bidder can provide the communications service within any performance, pricing, and delivery constraints. If more than one bidder satisfies the constraints, the Analysis Module 20 might favor one service provider, one communications network, or even a series/combination of multiple communications networks. The Analysis Module 20 might also accept another round of bidding/negotiation to further enhance performance, pricing, and/or delivery objectives. Once the Analysis Module 20 settles on a winning bid, the Analysis Module 20 then accepts service from the winner.

FIG. 1 also illustrates the multiple communications networks available to the client communications device 22. Each time the client communications device 22 requires communications service(s), the Analysis Module 20 discovers what communications networks are available to the client communications device 22. When the client communications device 22 requires communications service, the term "communications service" means the client communications device 22 requests a data upload and/or a data download via a communications network. The term "data" includes electronic information, such as, for example, facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, and/or (4) profiles associated with configuration, authenticity, security, and others. When the Analysis Module 20 discovers what communications networks are available to the client communications device 22, the term "available" means a communications network is accessible to the client communications device 22. That is, the client communications device 22 has the hardware requirement(s) and/or the software requirement(s) to access, and to communicate with, one or more of the communications networks.

As FIG. 1 shows, multiple communications networks may be available to the client communications device 22. The client communications device 22, at any one moment, may detect the presence of multiple wireline networks, such as a data network 24 and/or a Public Switched Telephone Network 26. The client communications device 22 accesses either the data network 24 or the Public Switched Telephone Network 26 via a wireline connection 28 to a communications switch 30. The term "wireline" means the client communications device 22 sends and receives signals using a physical connection (e.g., wire(s), cable(s), fiber, DSL). to the respective network 24 or 26.

The client communications device 22, at any one moment, may also detect the presence of one or more wireless communications networks. These wireless communications networks may include a GSM cellular network 32, a CDMA cellular network 34, a TDMA cellular network 36, and a GSM/CDMA/TDMA interoperating network 38 (such as a GSM-ANSI Interoperability Team (GAIT) network). As those of ordinary skill in the art recognize, the GSM cellular network 32 operates using the Global System for Mobile (GSM) communications technology standard, the CDMA cellular network 34 operates using a Code Division Multiple Access (CDMA) communications technology standard, and the TDMA cellular network 36 operates using a Time Division Multiple Access (TDMA) communications technology standard. Those of ordinary skill in the art also recognize that the GSM/CDMA/TDMA interoperating network 38 may operate using a GSM-ANSI Interoperability Team (GAIT) communications technology standard, a combination CDMA/GSM technology standard, and/or a combination TDMA/CDMA technology standard.

Figure 2:
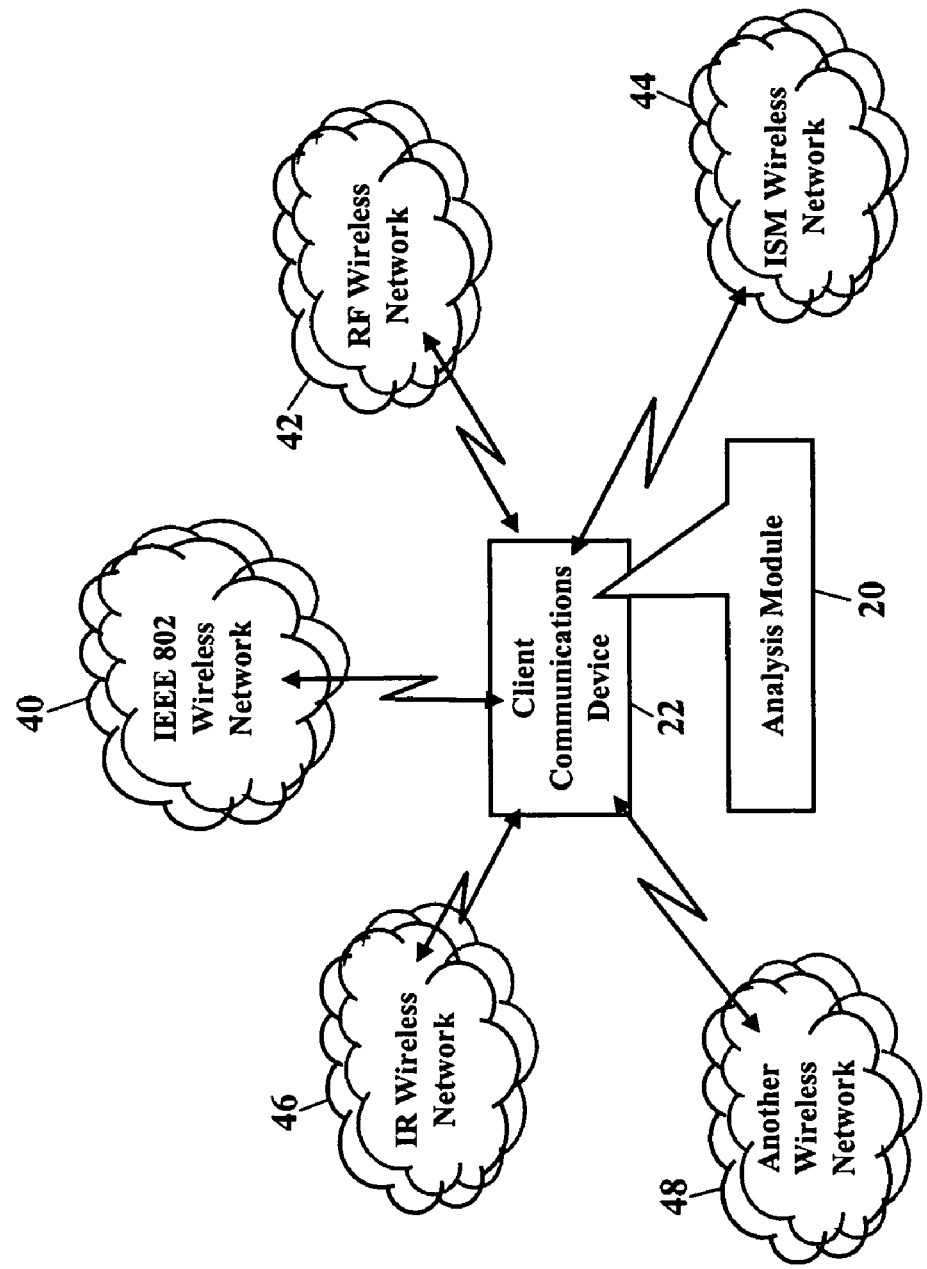
FIG. 2 is a schematic illustrating multiple wireless communications networks that may be available to the client communications device, according to more embodiments of this invention.

FIG. 2 shows even more wireless communications networks may be available to the client communications device 22. The client communications device 22, for example, may have access to an I.E.E.E. 802 wireless network 40. The I.E.E.E. 802 wireless network 40 utilizes any of the I.E.E.E 802 family of wireless technology standards to wirelessly communicate with the client communications device 22. The client communications device 22 may also have access to an RF wireless network 42 using the radio frequency (RF) portion of the electromagnetic spectrum. The client communications device 22 may also discover an ISM wireless network 44. The ISM wireless network 44 utilizes the Industrial, Scientific, and Medical (ISM) band of the electromagnetic spectrum to wirelessly communicate with the client communications device 22. One example of the ISM wireless network 44 would be a BLUETOOTH® network. The client communications device 22 may also discover an IR wireless network 46, and the IR wireless network 46 uses the infrared (IR) portion of the electromagnetic spectrum to provide wireless communication. The client communications device 22 may also have access to another wireless network 48, and the another wireless network 48 utilizes any other portion/frequency within the electromagnetic spectrum to wirelessly communicate with the client communications device 22.

The communications networks are dynamically discovered. Each time the user of the client communications device 22 desires to receive one or more communications services, the Analysis Module 20 preferably dynamically discovers what communications networks are available to the user. That is, with each data upload and/or data download, the Analysis Module 20 discovers what communications networks are available at that moment. The Analysis Module 20 could also employ alternate strategies for discovering available communications networks. The Analysis Module 20, for example, may discover the available communications networks according to a schedule, such as every hour, once per day, or any other interval. The Analysis Module 20 may also interface with an electronic calendar (such as a PALM® handheld organizer or MICROSOFT® OUTLOOK®) (PALM® is a registered trademark of Palm, Inc., while MICROSOFT® and OUTLOOK® are registered trademarks of Microsoft Corporation). The Analysis Module 20 could also interface with a Global Positioning System (GPS) and utilize GPS coordinates to discover the available communications networks. When, for example, the GPS coordinates indicate a change of "n" units, the Analysis Module 20 may discover what available communications networks are in its vicinity. The variable "n" may be feet, meters, miles, kilometers, or any other desired unit of measure.

Figure 3:
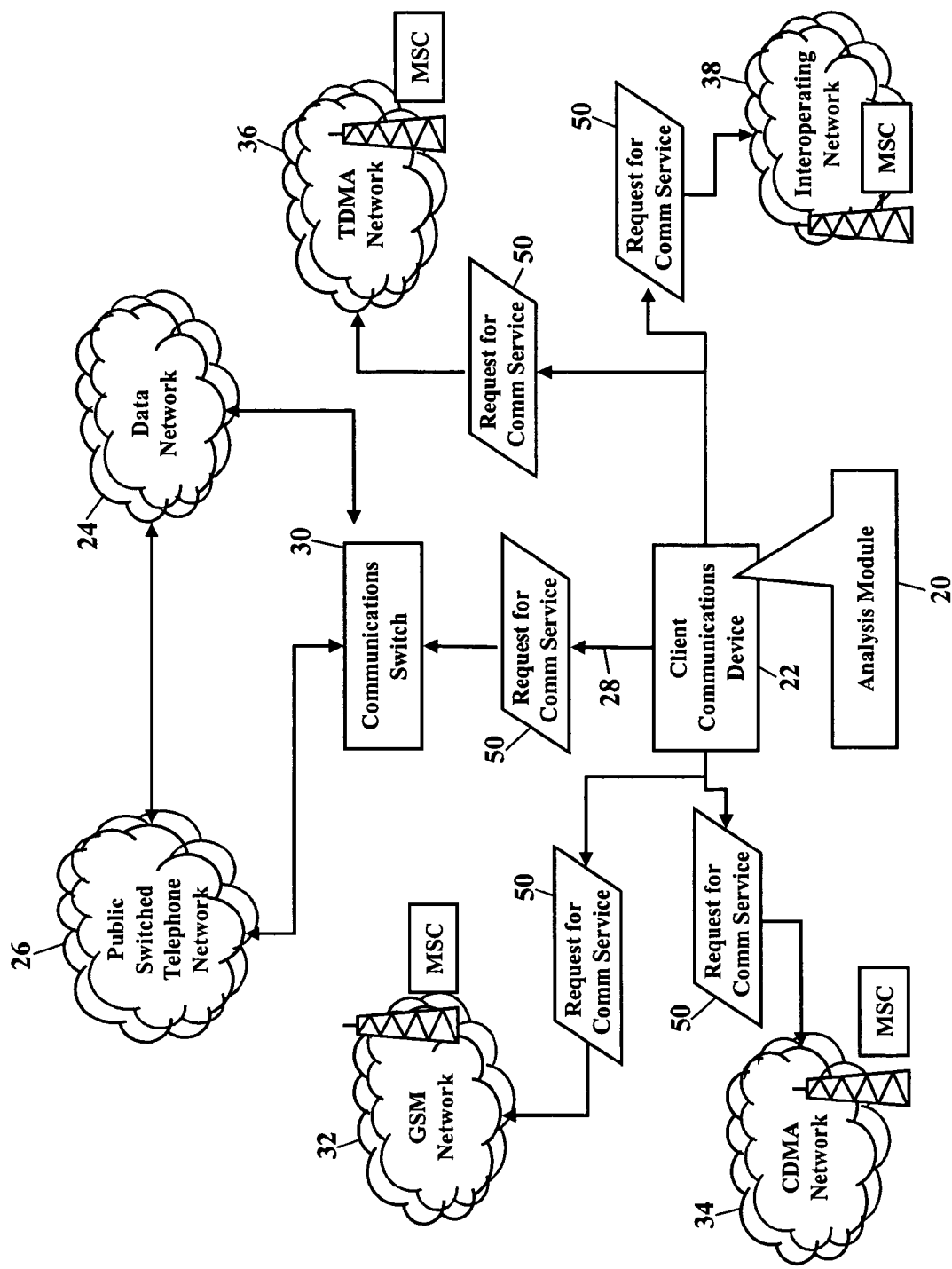
FIGS. 3 and 4 are schematics illustrating a request for communications service, according to still more embodiments of this invention.
Figure 4:
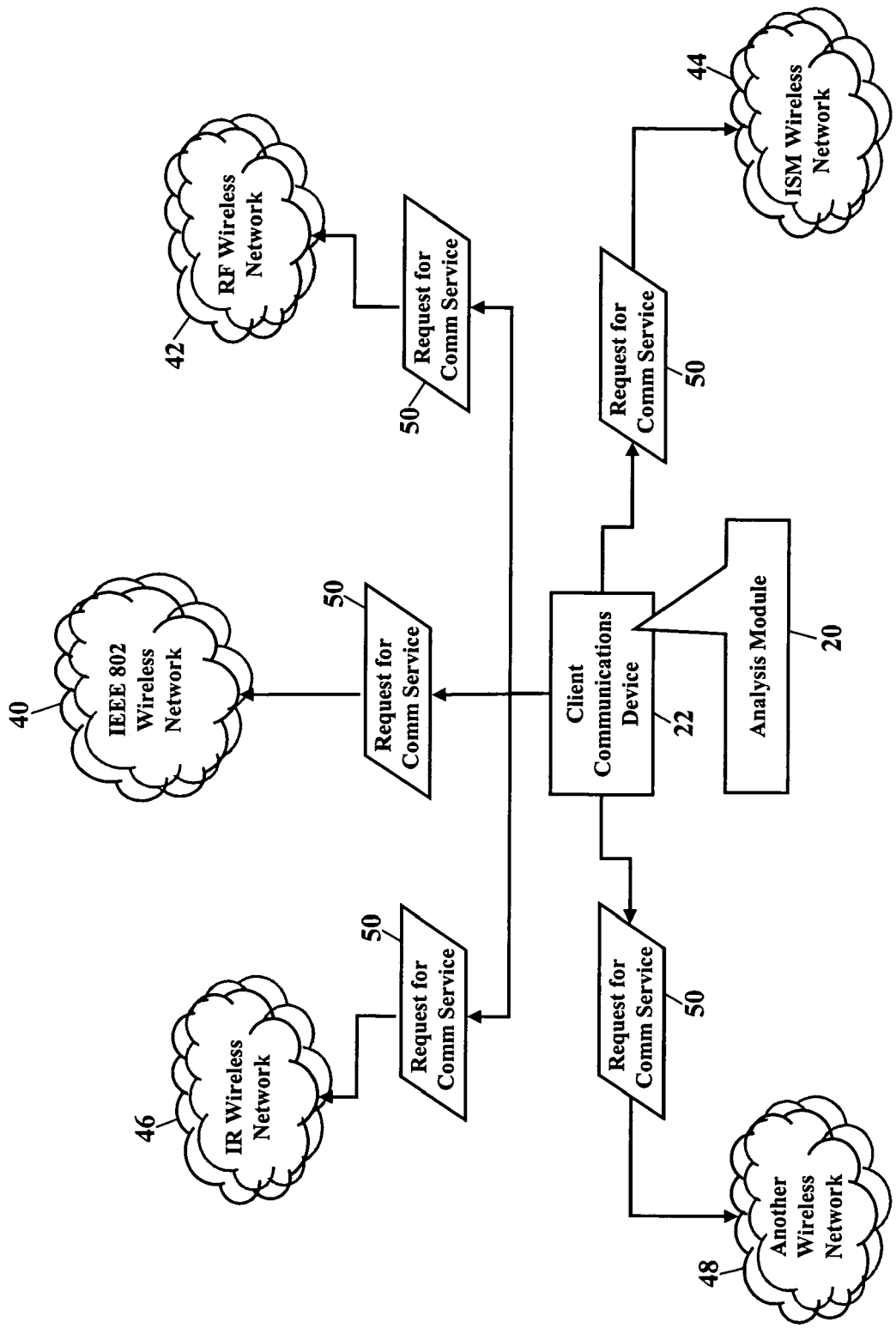

Once the client communications device 22 discovers the available communications networks, the Analysis Module 20 initiates a request 50 for communications service. As FIGS. 3 and 4 show, the request 50 for communications service is communicated from the client communications device 22 to one or more of the wireline/wireless communications networks. FIG. 3, for example, shows the Analysis Module 20 initiating the request 50 for communications service from the client communications device 22 to the data network 24 and/or the Public Switched Telephone Network 26 via the wireline connection 28 to the communications switch 30. The Analysis Module 20 also initiates a wireless communication of the request 50 for communications service to the GSM cellular network 32, the CDMA cellular network 34, the TDMA cellular network 36, and the GSM/CDMA/TDMA interoperating network 38 using each network's respective technology standard. FIG. 4, similarly, shows the Analysis Module 20 initiating the request 50 for communications service from the client communications device 22 to the I.E.E.E. 802 wireless network 40, the RF wireless network 42, the ISM wireless network 44, the IR wireless network 46, and the another wireless network 48 using each network's respective frequency/portion of the electromagnetic spectrum.

Figure 5:
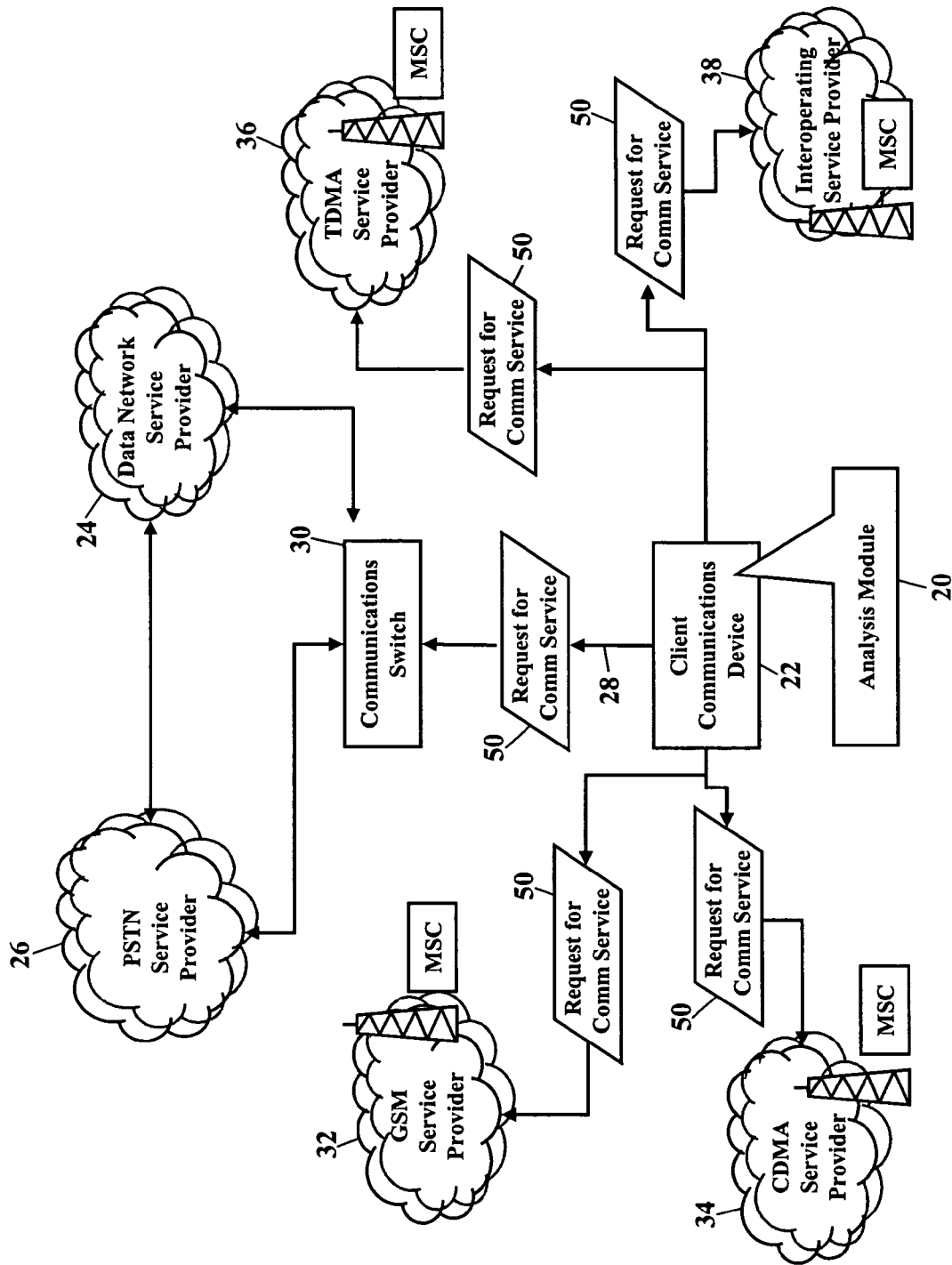
FIGS. 5 and 6 are schematics illustrating a service provider for each communications network.
Figure 6:
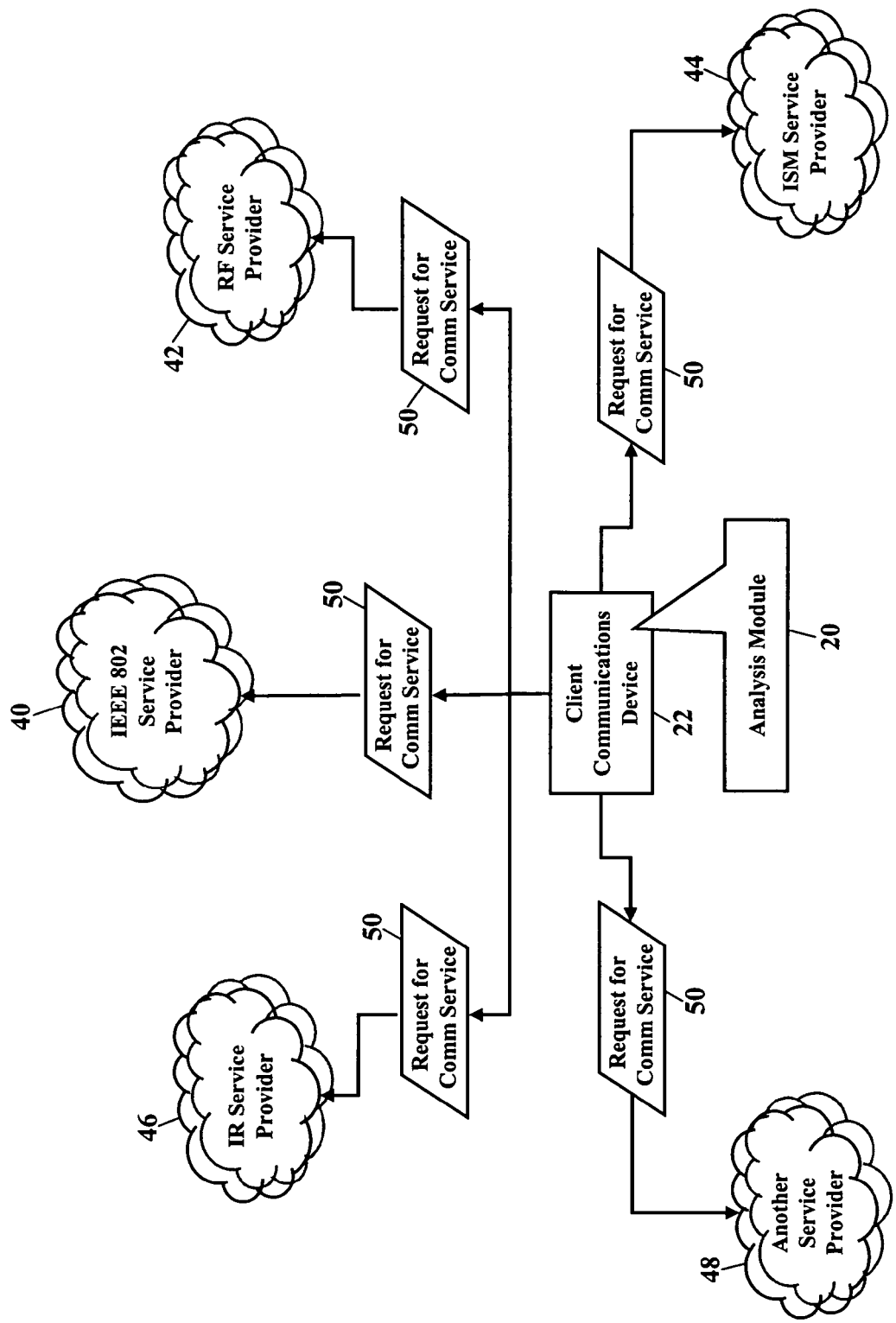

FIGS. 5 and 6 are schematics illustrating a service provider for each communications network. FIGS. 5 and 6 show the request 50 for communications service being communicated from the client communications device 22 to a service provider for each respective communications network. Each service provider provides access to at least one of the multiple communications networks 24, 26, 32, 34, 36, 38, 40, 42, 44, 46, and 48.

Figure 7:
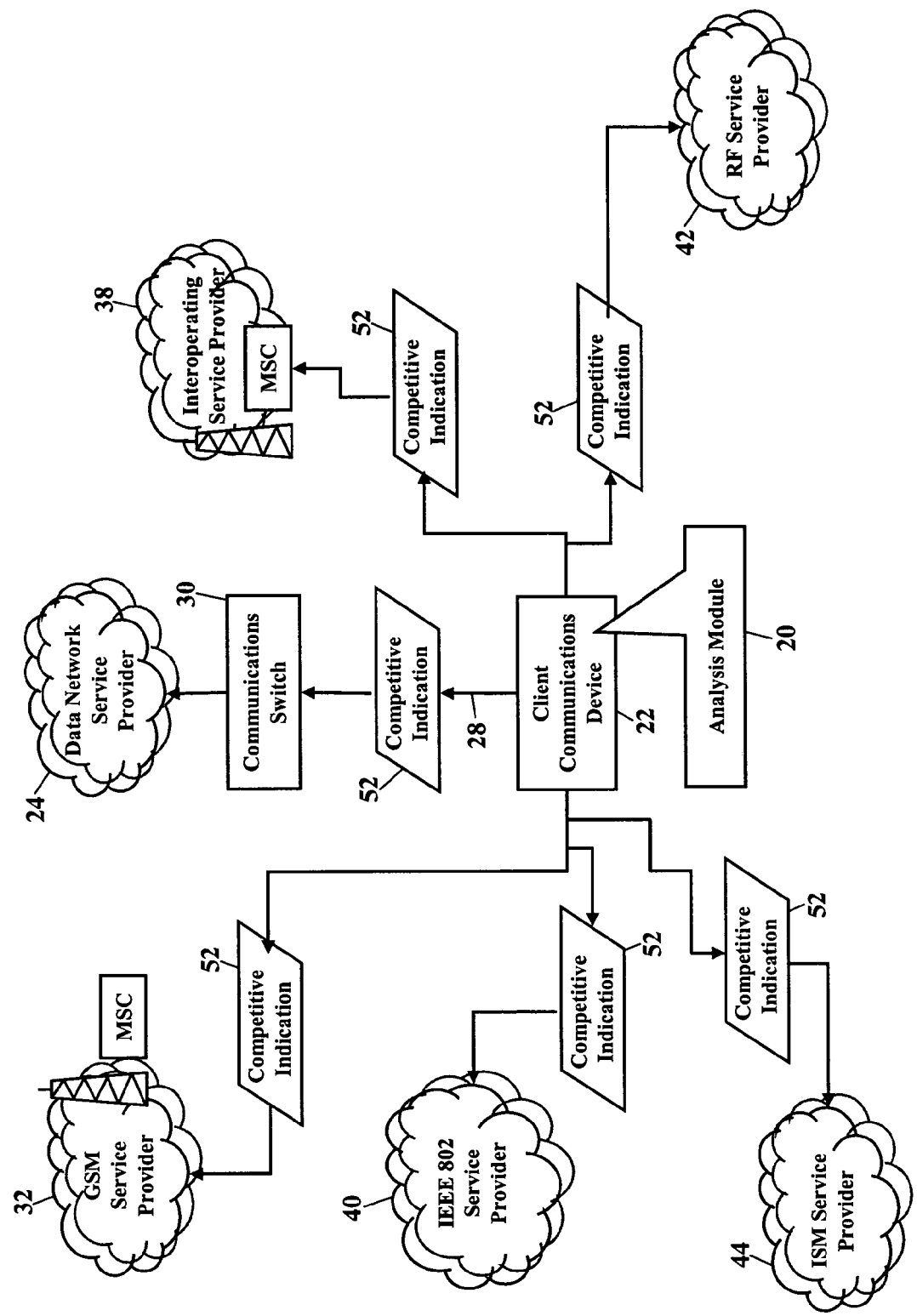
FIG. 7-12 are schematics illustrating a negotiations process for obtaining communications service, according to another of the embodiments of this invention.

Once the available communications networks are discovered, the Analysis Module 20 negotiates for communications service. The Analysis Module 20 negotiates with each service provider providing access to at least one of the multiple communications networks. FIG. 7 is a schematic illustrating this negotiations process. When the available communications networks are discovered, the Analysis Module 20 begins a negotiations process to obtain the best performance, pricing, and/or delivery objectives. The Analysis Module 20, for example, may openly communicate a competitive indication 52. This competitive indication 52 is communicated to each service provider of each available communications network. The competitive indication 52 intensifies competition amongst the service providers by informing each service provider of i) how many competing networks are available to the client communications device 22 and/or ii) what those available networks may be. The competitive indication 52, for example, may indicate that i) six (6) communications networks are available to the client communications device 22 and ii) those available communications networks are the data network 24, the GSM cellular network 32, the interoperating network 38, the I.E.E.E. 802 wireless network 40, the RF wireless network 42, and the ISM wireless network 44. Because the client communications device 22 has access to several competing communications networks, the competitive indication 52 helps each service provider determine their competitive position/posture.

Figure 8:
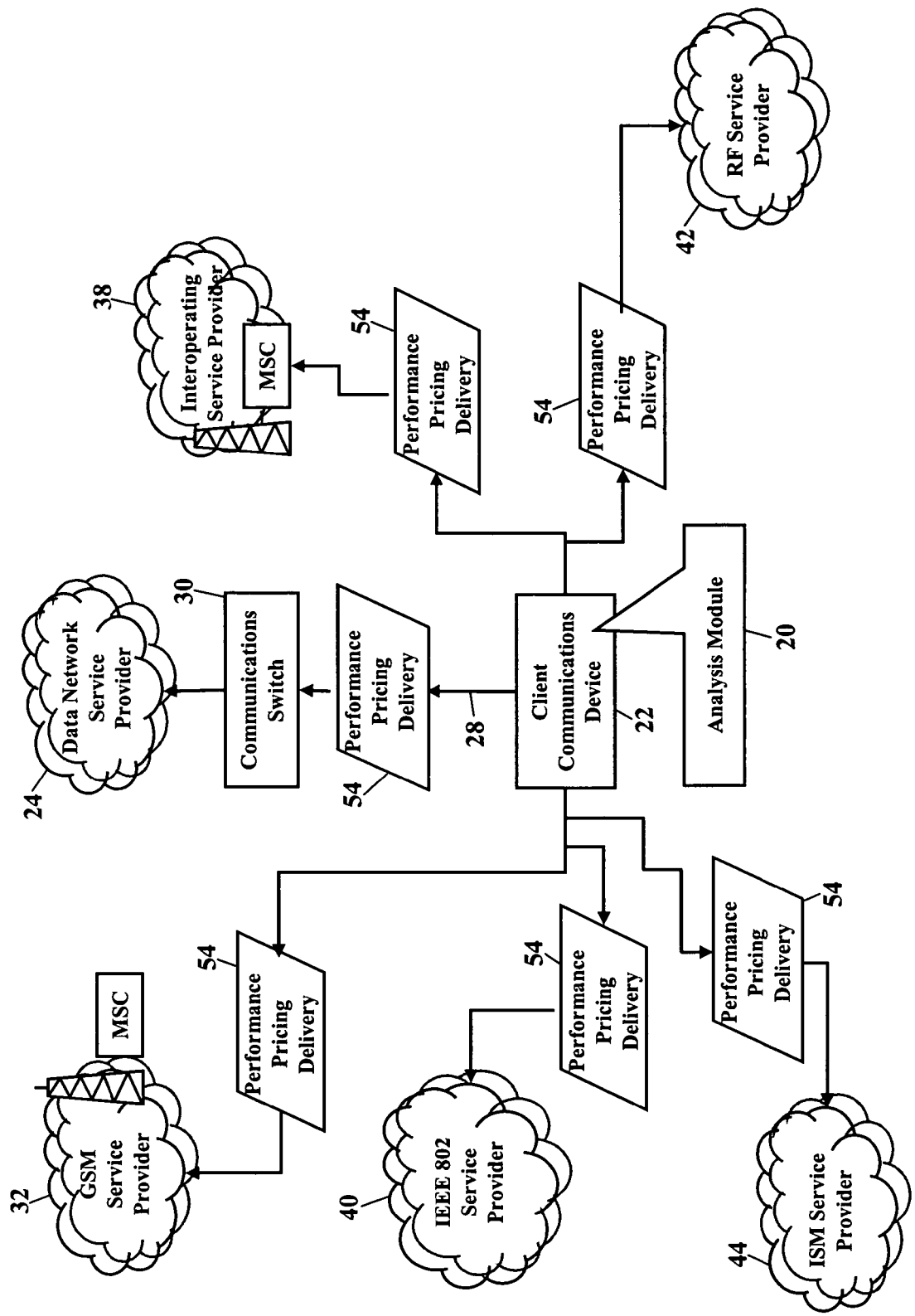
Figure 9:
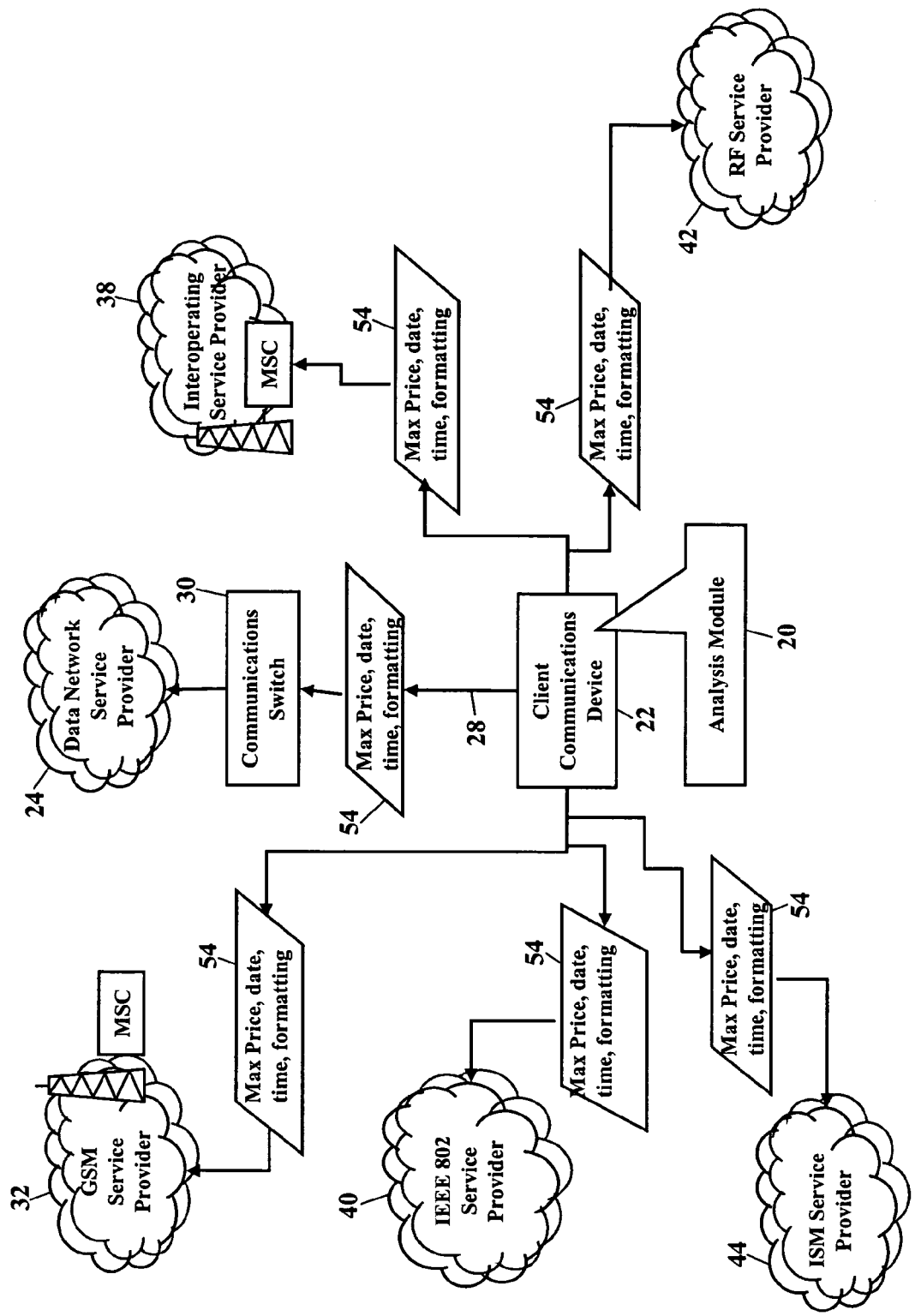

FIGS. 8 and 9 are schematics further illustrating this negotiations process. FIG. 8 shows that the Analysis Module 20 may communicate performance, pricing, and/or delivery objectives 54. The performance, pricing, and/or delivery objectives 54 identify constraints that each service provider must meet in order to win service. The user of the client communications device 22, for example, may require that data be delivered within three (3) minutes of acceptance of service, and the delivered data must be formatted to the size and the color capabilities of the client communications device 22. The performance, pricing, and/or delivery objectives 54 may also include a target, percentage, or maximum quantity of lost packets and/or a resolution of the delivered data. As FIG. 9 illustrates, the performance, pricing, and/or delivery objectives 54 may include at least one of i) a maximum price above which communications service will be denied, ii) a date by which the request for communications service should be fulfilled, iii) a time by which the request for communications service should be fulfilled, and iv) formatting for the requested communications service.

Figure 10:
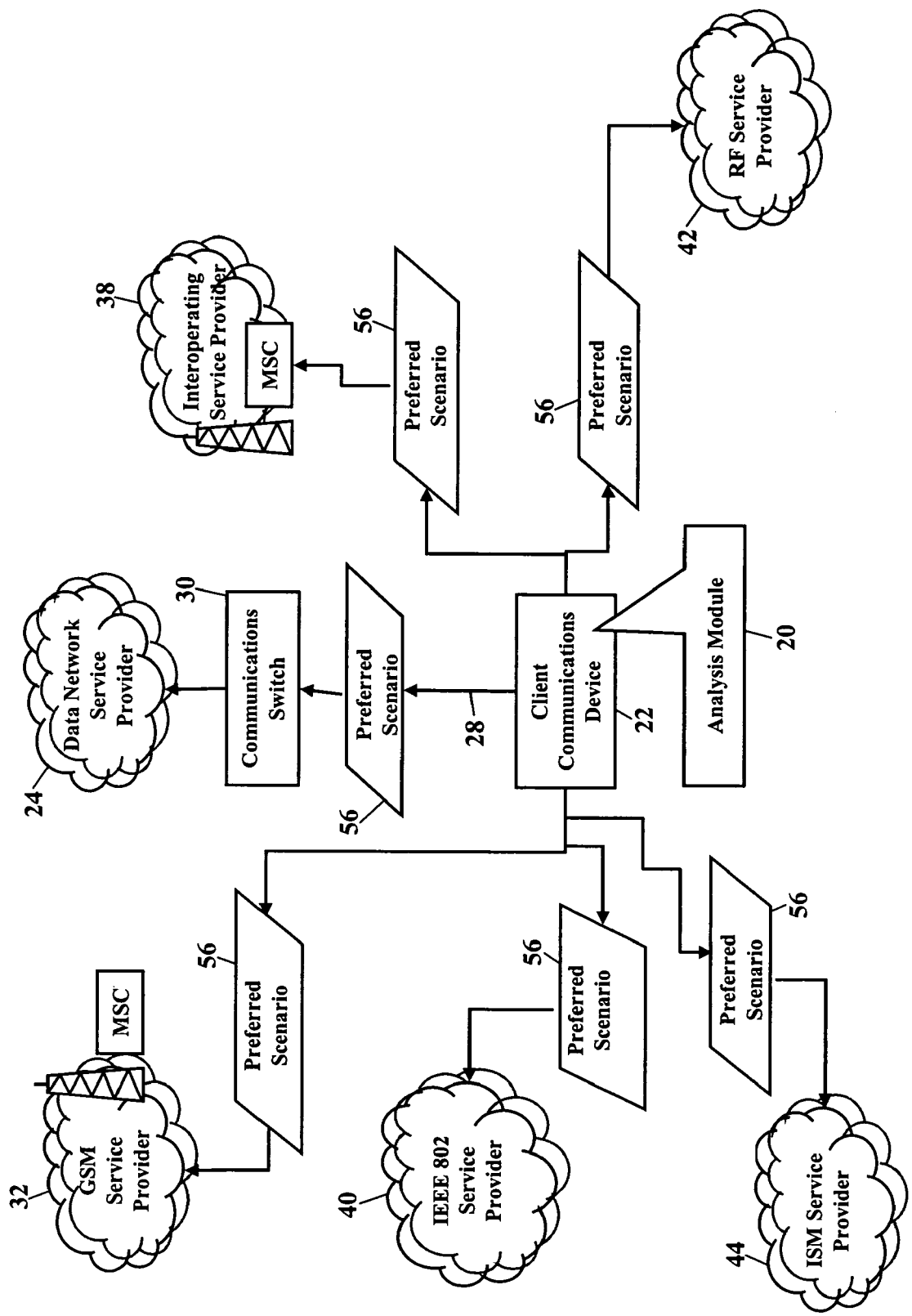

FIG. 10 is a schematic further illustrating the negotiations process. FIG. 10 illustrates that the Analysis Module 20 may also communicate a preferred scenario 56. The preferred scenario 56 describes the user's, or the Analysis Module's, preferred scenario of segmentation, dispersion, and assemblage of electronic data when fulfilling the request for communications service. That is, the preferred scenario 56 describes how the user of the client communications device 22 wants data segmented, dispersed, and then reassembled. The preferred scenario 56 may be stored within memory of the client communications device 22, stored/maintained within a computer device (e.g., a computer server) remotely operating on any of the available communications networks, and/or stored/maintained within an applications server communicating with the communications switch 30 (the remotely operating computer device and the applications server are not shown for simplicity). The preferred scenario 56 may be stored/maintained within a set of subscriber-specified rules (not shown for simplicity), and/or the preferred scenario 56 may be stored/maintained within a Service Level Agreement (also not shown for simplicity).

Figure 11:
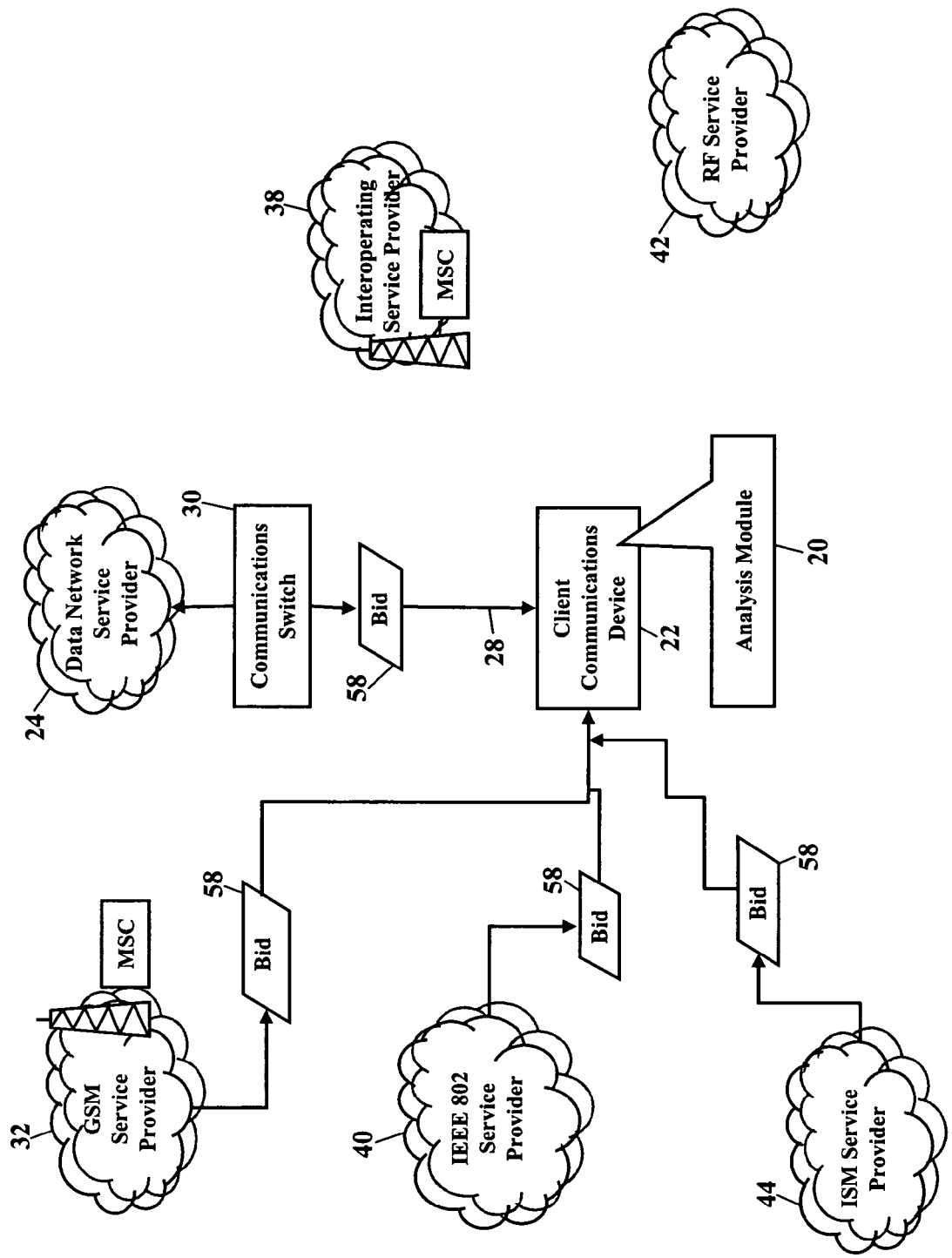
Figure 12:
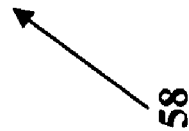

FIGS. 11 and 12 further illustrate the negotiations process. Once the Analysis Module 20 initiates communication of any constraints, objectives, or other criteria to intensify competition amongst the service providers, one or more of the service providers may bid for the communications service. As FIG. 11 shows, the Analysis Module 20 may receive a bid 58 to fulfill the request for communications service. Because all the service providers of the available networks know the constraints, objectives, or other criteria for the requested communications service, some service providers may choose to not bid—that is, one or more service providers may forego the routing opportunity (such as the interoperating network 38 service provider and the RF wireless network 42 service provider). Those service providers who wish to further participate submit the bid 58. As FIG. 11 shows, the client communications device 22 receives the bid 58 via the data network 24, the GSM cellular network 32, the I.E.E.E. 802 wireless network 40, and the ISM wireless network 44.

FIG. 12 shows the possible contents of each bid 58. Each electronic bid 58 would contain at least one of the following electronic information: i) a price for utilizing the particular service provider's communications network, ii) a date that the request for communications service will be fulfilled, and iii) a time that the request for communications service will be fulfilled. Each bid 58 may also contain suggestions for alternative performance, pricing, and/or delivery options. One service provider, for example, might offer a much lower price if the request for communications service could be fulfilled during evening or night hours. Another service provider might offer an earlier date of fulfillment with little increase in price. If the user could accept black and white video/images, still another service provider might offer a drastically lower price.

Once all the bids 58 are received, the Analysis Module 20 evaluates the submitted bids 58. The Analysis Module 20 may include software programming that favors one bid over another, that favors one service provider over another, and/or that favors one communications network over another. The Analysis Module 20 may discard some bids that violate internal constraints. The Analysis Module 20 may discard or reject a bid from a service provider with an unacceptable history of performance, pricing, and/or delivery. The Analysis Module 20 may also determine if the suggested alternative performance, pricing, and/or delivery option is acceptable. Once all the bids 58 are evaluated, the Analysis Module 20 may even initiate another round of bidding to further hone performance, pricing, and/or delivery objectives (thus repeating the negotiation processes shown in FIGS. 7-12).

Figure 13:
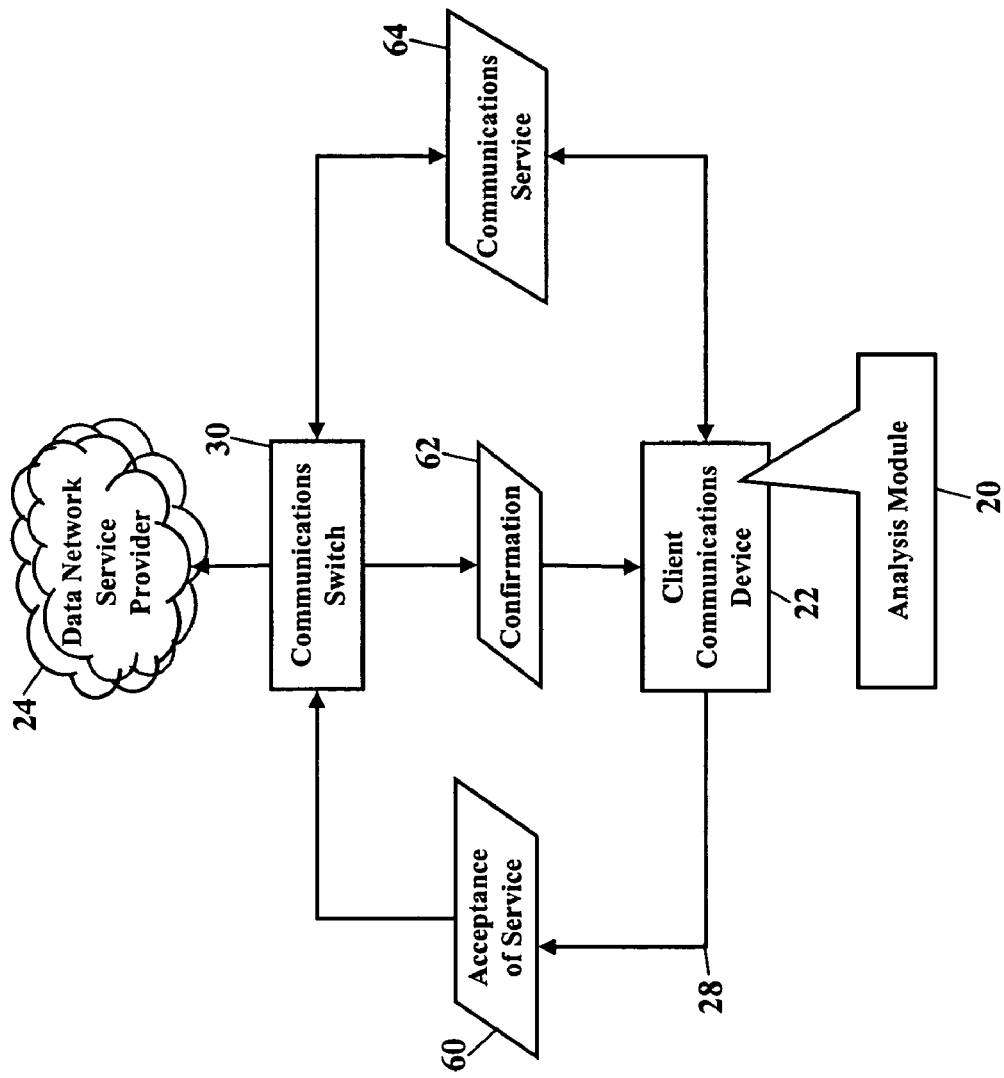
FIG. 13 is a schematic illustrating the Analysis Module accepting a winning bid for communications service, according to still more embodiments of this invention.

FIG. 13 shows the Analysis Module 20 accepting the winning bid. After the Analysis Module 20 evaluates the submitted bids 58, and perhaps after the Analysis Module 20 determines that no further negotiations are necessary or desirable, the Analysis Module 20 accepts the winning bid. The Analysis Module 20 initiates communication of an acceptance 60 of service to the winning service provider. The acceptance 60 of service is communicated from the client communications device 22 to the winning service provider via the respective communications network. FIG. 13, for example, shows the data network 24 service provider as the winner of the negotiations process, so the data network 24 service provider receives the acceptance 60 of service. The winning service provider may return communicate a confirmation 62 of the winning bid. The client communications device 22 then receives the requested communications service 64 (e.g., data upload/download) from the winning service provider.

Figure 14:
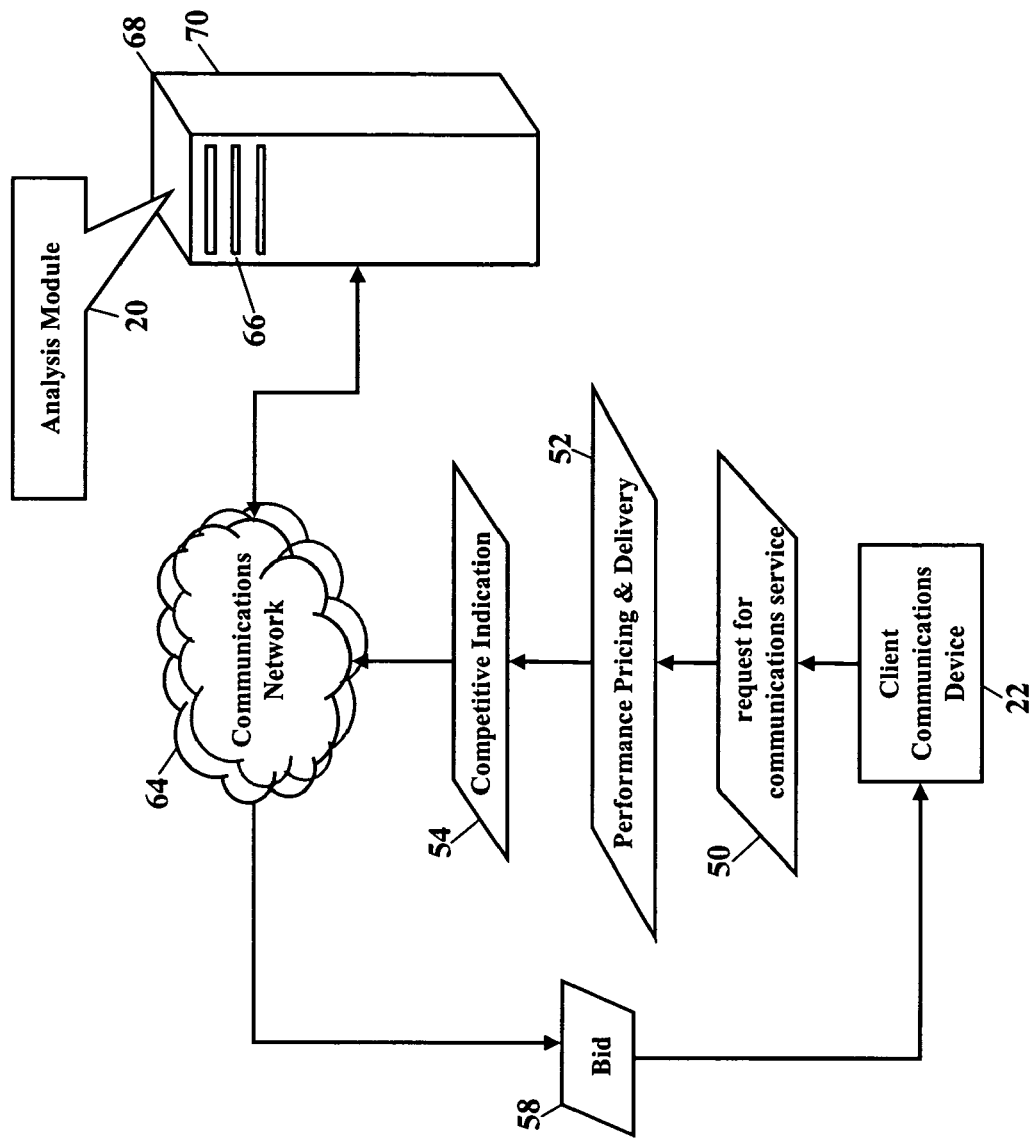
FIGS. 14 and 15 are schematics illustrating another of the embodiments of this invention.

FIG. 14 is a schematic illustrating another of the embodiments of this invention. FIG. 14 shows the Analysis Module 20 operating within a communications network 64. This communications network 64 represents another of the possible operating environments for the Analysis Module 20. The Analysis Module 20 is stored within memory 66 of a computer device 68, such as a computer server 70 communicating with the communications network 64. Each time the client communications device 22 requires communications service, the Analysis Module 20 receives the request 50 for communications service from the client communications device 22. The request 50 for communications service requests communications service via the communications network 64. Those of ordinary skill in the art understand the communications network 64 may include any available communications network, such as the data network, the Public Switched Telephone Network, the GSM cellular network, the CDMA cellular network, the TDMA cellular network, the GSM/CDMA/TDMA interoperating network, the I.E.E.E. 802 wireless network, the RF wireless network, the ISM wireless network, the IR wireless network, and/or the another wireless network (shown, respectively, as reference numerals 24, 26, 32, 34, 36, 38, 40, 42, 44, 46, and 48 in FIGS. 1-11).

The Analysis Module 20 receives the request 50 for communications service. The client communications device 22 communicates the request 50 for communications service to the computer server 70, and thus the Analysis Module 20, via the communications network 64. When the Analysis Module 20 receives the request 50 for communications service, the Analysis Module 20 develops the bid 58 to utilize the communications network 64 to fulfill the request 50 for communications service. Once the bid 58 is developed, the Analysis Module 20 initiates communication of the bid 58 to the client communications device 22, again via the communications network 64. The client communications device 22 receives the bid 58 and compares/evaluates the bid 58 with any other bids received from other available communications networks and/or service providers. The client communications device 22 may then accept or deny the bid 58.

The Analysis Module 20 may employ numerous strategies when developing the bid 58. The Analysis Module 20, for example, may receive the competitive indication 52. The competitive indication 52, as mentioned above, intensifies competition amongst the service providers by openly identifying i) how many competing networks are available and/or ii) what those available networks may be. The Analysis Module 20 uses the competitive indication 52 to improve the competitiveness of the bid 58. The Analysis Module 20 may also receive the performance, pricing, and/or delivery objectives 54 that each service provider must meet in order to win service. The Analysis Module 20 uses the performance, pricing, and/or delivery objectives 54 to improve the competitiveness of the bid 58. The Analysis Module 20 may ascertain a preferred scenario of segmentation, dispersion, and assemblage of electronic data to fulfill the request 50 for communications service. That is, the preferred scenario describes the highest quality scenario, the most reliable scenario, the most efficient scenario, the most profitable scenario, or, in general terms, the "preferred scenario" for fulfilling the request 50 for communications service. When the Analysis Module 20 ascertains the preferred scenario, the Analysis Module 20 may assess an availability of network routing to fulfill the request 50 for communications service. The Analysis Module 20 may also assess an availability of network bandwidth to fulfill the request 50 for communications service. If a Service Level Agreement is associated with the client communications device 22, the Analysis Module 20 determines how to utilize the available network routing/bandwidth to satisfy the Service Level Agreement. The Analysis Module 20 may determine that the technique of recursive segmentation could be used for fast and efficient data compression, data description, and data prediction. The Analysis Module 20 may utilize a set of subscriber-specified rules to determine how electronic data is formatted for presentation on the client communications device 22. That is, the set of subscriber-specified rules determines how uploaded/downloaded electronic data, such as movies and other audio-video data, is formatted to suit the user's needs.

Figure 15:
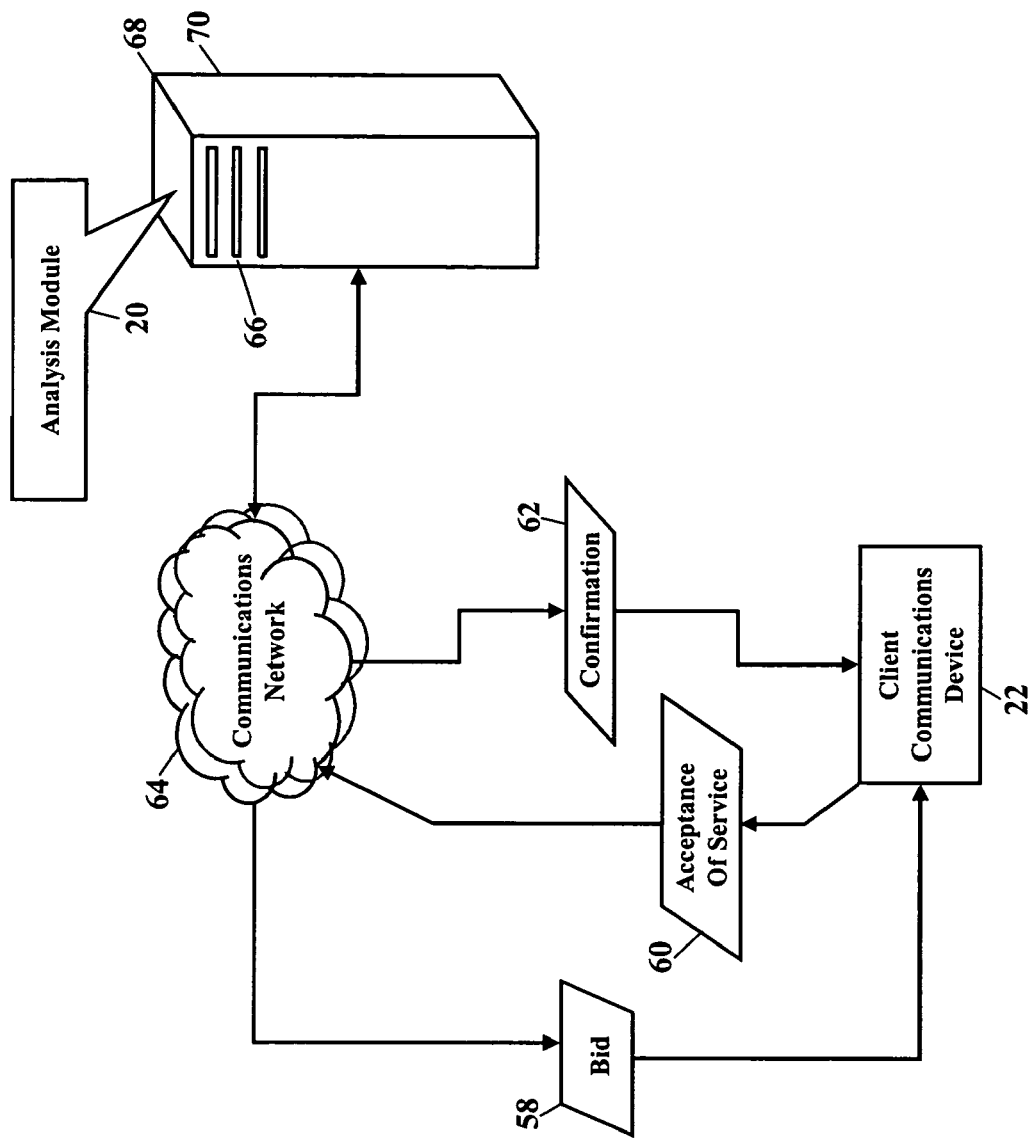

FIG. 15 is a schematic illustrating acceptance of the winning bid. If the submitted bid 58 is accepted, the client communications device 22 communicates the acceptance 60 of service to the winning service provider. The acceptance 60 of service is communicated from the client communications device 22 to the winning service provider via the communications network 64. The winning service provider may then return communicate the confirmation 62 of the winning bid. The client communications device 22 then receives the requested communications service (e.g., data upload/download) from the winning service provider, via the communications network 64.

Figure 16:
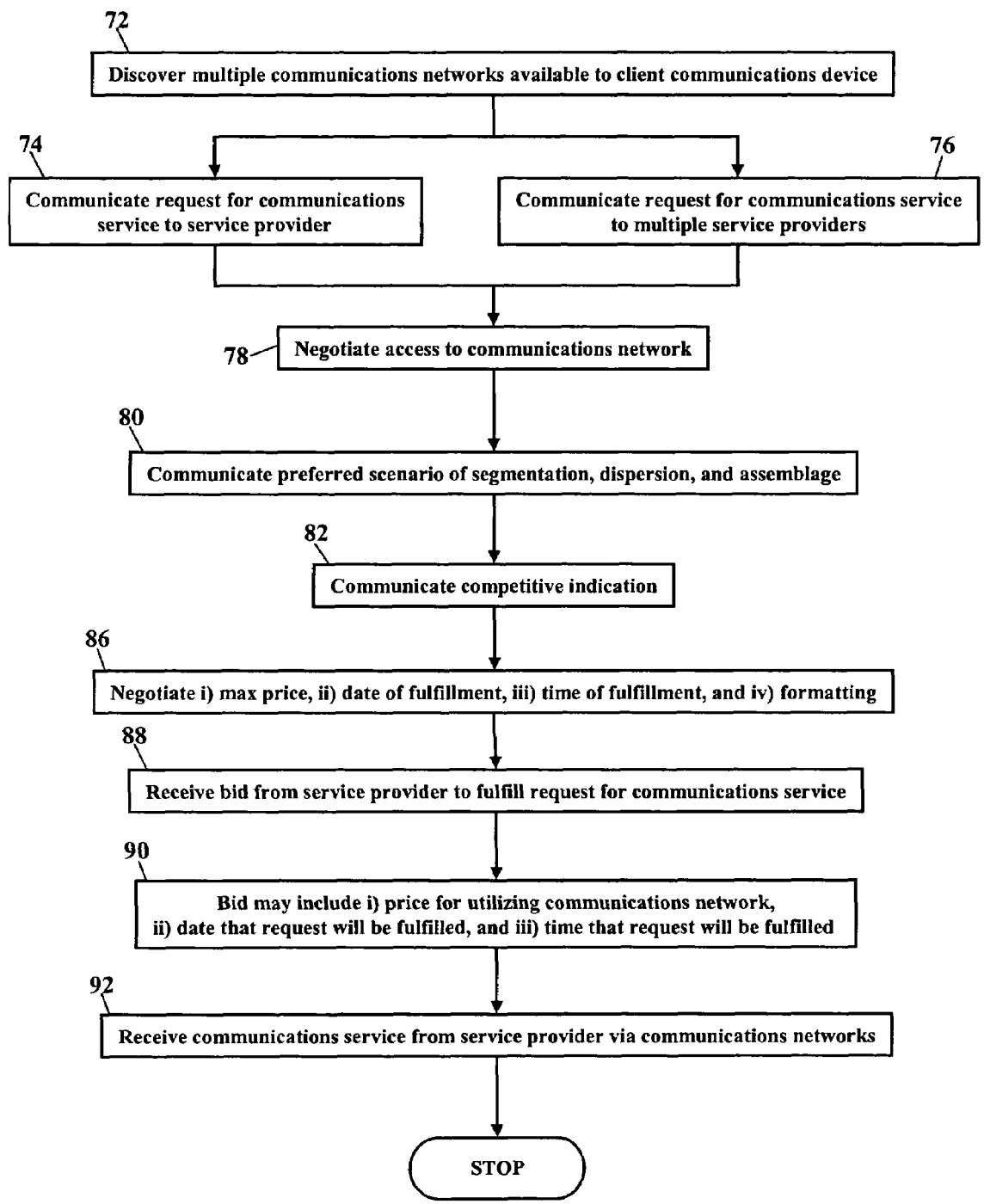
FIG. 16 is a flowchart illustrating a method of providing communications service.

FIG. 16 is a flowchart illustrating a method of providing communications services. Multiple communications networks, that are available to a client communications device, are discovered (Block 72). The multiple communications networks may include at least one of i) a wireline network available to the client communications device and ii) a wireless network available to a client communications device. A request for communications service is communicated from the client communications device to at least one service provider (Block 74). The at least one service provider provides access to at least one of the multiple communications networks. The request for communications service may be communicated to multiple service providers (Block 76), with each service provider providing access to at least one of the multiple communications networks. Access to at least one of the multiple communications networks is negotiated (Block 78). A preferred scenario of segmentation, dispersion, and assemblage of electronic data may be communicated (Block 80). A competitive indication of the multiple communications networks may be communicated (Block 82). The competitive indication identifies what communications networks are available to the client communications device. The negotiations may also communicate at least one of i) a price above which communications service will be denied, ii) a date by which the request for communications service should be fulfilled, iii) a time by which the request for communications service should be fulfilled, and iv) formatting for the requested communications service (Block 84). A bid may be received from the at least one service provider to fulfill the request for communications service (Block 86). The bid may include at least one of i) a price for utilizing the at least one multiple communications networks, ii) a date that the request for communications service will be fulfilled, and iii) a time that the request for communications service will be fulfilled (Block 88). Communications service is then received from the at least one service provider via at least one of the multiple communications networks (Block 90).

Figure 17:
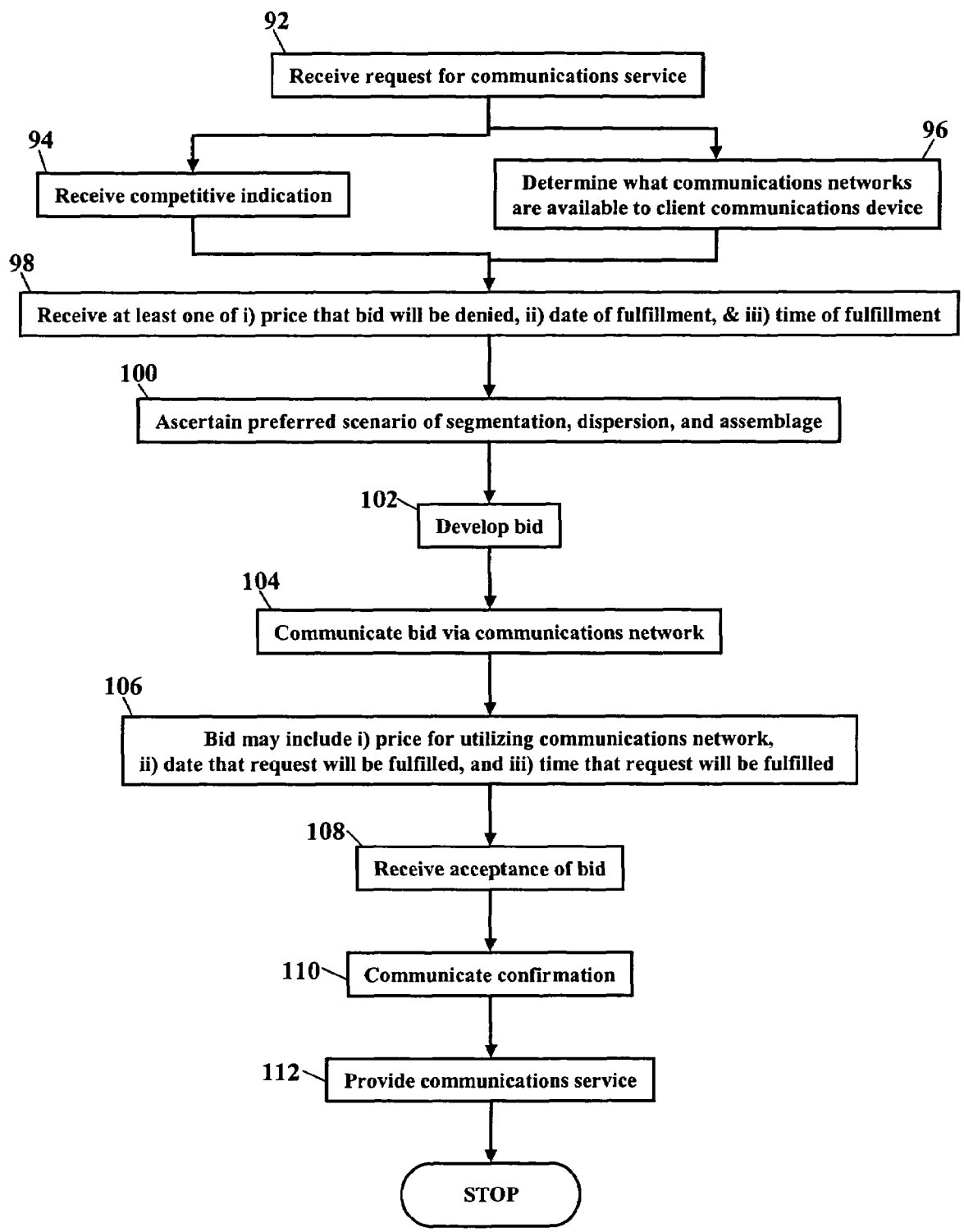
FIG. 17 is a flowchart illustrating another method of providing communications service.

FIG. 17 is another flowchart illustrating a method of providing communications services. A request for communications service is received (Block 92). The request for communications service originates from a client communications device and requests communications service from a communications network available to the client communications device. A competitive indication is received (Block 94), and the competitive indication identifies what communications networks are available to the client communications device. The service provider may additionally or alternatively determine that multiple communications networks are available to the client communications device (Block 96). The service provider may also receive at least one of i) a price above which any bid will be denied, ii) a date by which the request for communications service should be fulfilled, and iii) a time by which the request for communications service should be fulfilled (Block 98). A preferred scenario of segmentation, dispersion, and assemblage of electronic data is ascertained to fulfill the request for communications service (Block 100). A bid to utilize the communications network is developed (Block 102), and the bid is communicated to the client communications device (Block 104). The bid may include at least one of i) a price for utilizing the communications network, ii) a date that the request for communications service will be fulfilled, and iii) a time that the request for communications service will be fulfilled (Block 106). The service provider may receive an acceptance of the bid (Block 108) and return communicate a confirmation (Block 110). The service provide then provides communications service, via the communications network, according to the request for communications service.

The Analysis Module (shown as reference numeral 20 in FIGS. 1-15) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Analysis Module to be easily disseminated. A computer program product for providing communications services includes the Analysis Module stored on the computer-readable medium. The Analysis Module discovers multiple communications networks available to a client communications device. The Analysis Module communicates a request for communications service from the client communications device to at least one service provider, with the at least one service provider providing access to at least one of the multiple communications networks. The Analysis Module negotiates with the at least one service provider for access to at least one of the multiple communications networks. The Analysis Module receives communications service from the at least one service provider via at least one of the multiple communications networks.

The Analysis Module may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing communications services, comprising:
    discovering, at a client device, multiple communications networks available to the client device;
    communicating a request for communications service from the client device to a service provider, the service provider providing access to at least one of the multiple communications networks;
    negotiating, at the client device, with the at least one service provider for access to at least one of the multiple communications networks;
    receiving, at the client device, a bid from the at least one service provider to fulfill the request for communications service; and
    receiving communications service from the at least one service provider via at least one of the multiple communications networks.

2. A method according to claim 1, wherein discovering multiple communications networks comprises discovering at least one of i) a wireline network available to the client device and ii) a wireless network available to a client device.

3. A method according to claim 1, wherein discovering the multiple communications networks comprises dynamically discovering, with at least one of each data upload and with each data download, the multiple communications networks available to a client communications device.

4. A method according to claim 1, further comprising communicating the request for communications service to multiple service providers, each service provider providing access to at least one of the multiple communications networks.

5. A method according to claim 1, wherein discovering the multiple communications networks comprises dynamically discovering, according to a schedule, the multiple communications networks available to a client communications device.

6. A method according to claim 1, wherein discovering the multiple communications networks comprises dynamically discovering the multiple communications networks when global positioning system coordinates indicate a change of "n" units.

7. A method according to claim 1, further comprising comparing the bid to other bids received from other service providers.

8. A method according to claim 1, wherein negotiating with the at least one service provider comprises communicating a preferred scenario of segmentation, dispersion, and assemblage of electronic data when fulfilling the request for communications service.

9. A method according to claim 1, wherein negotiating with the at least one service provider comprises communicating a competitive indication of the multiple communications networks that are available to the client communications device.

10. A method according to claim 1, wherein negotiating with the at least one service provider comprises communicating at least one of i) a price above which communications service will be denied, ii) a date by which the request for communications service should be fulfilled, iii) a time by which the request for communications service should be fulfilled, and iv) formatting for the requested communications service.

11. A method according to claim 1, wherein negotiating with the at least one service provider comprises receiving at least one of i) a price for utilizing the at least one multiple communications networks, ii) a date that the request for communications service will be fulfilled, and iii) a time that the request for communications service will be fulfilled.

12. A method of providing communications services, comprising:
    receiving, at a service provider, a request for communications service, the request for communications service originating from a client device, the request for communications service requesting communications service from a communications network available to the client device;
    ascertaining a preferred scenario of segmentation, dispersion, and assemblage of electronic data to fulfill the request for communications service;
    developing a bid to fulfill the request for communications service, the bid comprising a price for utilizing the service provider's services; and
    communicating the bid to the client device,
    wherein the client device accepts or denies the bid.

13. A method according to claim 12, further comprising receiving an indication of multiple communications networks that are available to the client communications device.

14. A method according to claim 12, further comprising determining that multiple communications networks are available to the client communications device.

15. A method according to claim 12, further comprising receiving at least one of i) a price above which any bid will be denied, ii) a date by which the request for communications service should be fulfilled, and iii) a time by which the request for communications service should be fulfilled.

16. A method according to claim 12, further comprising receiving information describing how many networks are available to the client device.

17. A method according to claim 12, further comprising receiving a constraint that the service provider must meet in order to win the requested communications service.

18. A method according to claim 12, wherein ascertaining the preferred scenario of segmentation, dispersion, and assemblage of electronic data comprises assessing an availability of network bandwidth to fulfill the request for communications service.

19. A method according to claim 12, further comprising receiving an acceptance of the bid to utilize the communications network to fulfill the request for communications service.

20. A computer program product comprising computer readable media storing instructions for performing a method, the method comprising:

discovering, at a client device, multiple communications networks available to the client device;

communicating a request for communications service from the client device to a service provider, the service provider providing access to at least one of the multiple communications networks;

negotiating at the client device, with the at least one service provider for access to at least one of the multiple communications networks;

receiving, at the client device, a bid from the at least one service provider to fulfill the request for communications service; and receiving communications service from the at least one service provider via at least one of the multiple communications networks.

\* \* \* \* \*